May 19, 1936.     S. SAMUEL     2,041,624

APPAREL FASTENER

Filed Aug. 24, 1935

Inventor

Samuel Samuel,

By Clarence A. O'Brien
Attorney

Patented May 19, 1936

2,041,624

UNITED STATES PATENT OFFICE 2,041,624

APPAREL FASTENER

Samuel Samuel, Worcester, Mass.

Application August 24, 1935, Serial No. 37,740

1 Claim. (Cl. 24—222)

This invention relates to that classification of quick separable fasteners frequently referred to in general terms as of the hook and eye type and it has specific reference to a structure which is aptly fitted for use in connection with wearing apparel but is capable of equally well adapted uses in other lines of endeavor.

Briefly, I accomplish what I desire through the adoption and use of a simple and economical two-part assemblage characterized by male and female sections these being especially designed for quick detachable association and engageable and disengageable by slight relatively rotatable movement of one sectional part in relation to the other.

Stated more explicitly the invention involves a pair of companion sections adapted to be disposed together in overlapping or superimposed relationship, the sections being substantially pear-shaped in configuration so as to utilize the features of this special configuration to facilitate connection and disconnection.

A feature of the construction has to do with a relatively stationary and female section or member having a keyhole slot formed therein so that the slot portion divides the lobe-like portions or furcations in a manner to expedite insertion and removal of a T-shaped connecting element carried by the complemental male section.

A further feature of the construction has to do with complemental fastener sections of general heart-like design susceptible of being more easily matched and joined together due to this indicating way of putting the parts together when assembled so that the respective apex and lobe-end portion match or register with each other.

An additional improvement has to do with the provision of a T-shaped catch or connecting element the head portion of which is disposed obliquely with respect to the longitudinal dimension of the part which carries it so that by giving a slight rotary twist to said part said head can be readily lined up with the key-hole slot and inserted and thereafter returned to the desired connecting position.

Then too, novelty has to do with this offset or obliquely disposed T-shaped connector element cooperable with the rounded surfaces of the lobe-like portions of the female member which then function as cams to facilitate feeding or piloting the head into the key-hole slot for retention purposes.

Other features and advantages may become more readily apparent from the following description and drawing.

Figure 1:
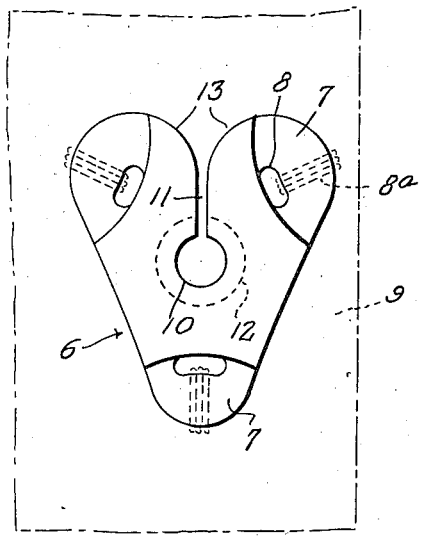
Figure 1 is an elevational view of that part or section hereinafter differentiated both as the relatively fixed and/or female section, this being indicated by dotted lines as properly attached to one section of a lady's garment.
Figure 2:
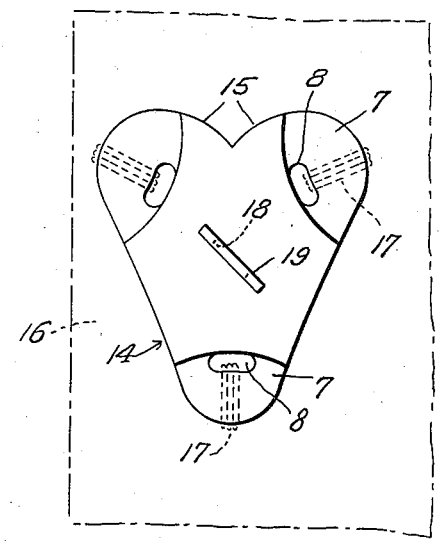
Figure 2 is a similar view of the remaining relatively rotatable or movable male section, illustrating how it is attached to the companion section of the garment for satisfactory and efficient usage.
Figure 3:
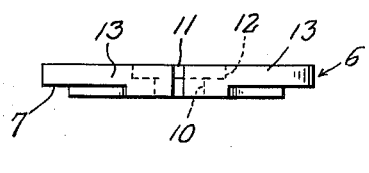
Figure 3 is a top plan or edge view of the section shown in Figure 1.
Figure 4:
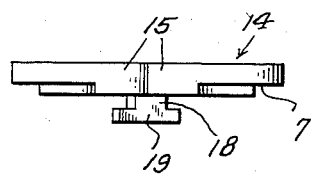
Figure 4 is a corresponding edge view of the section shown in Figure 2.

Referring to the female part or section this is denoted by the numeral 6 and is made from suitable material and as before stated is of general heart configuration or somewhat pear-shaped in outline. Each of the corner portions thereof are cut away or recessed as indicated at 7 to accommodate the stitching 8a which passes through the apertures 8 to hold the part in place on the fabric or garment 9. At its center this part is divided with a hole 10 preferably of circular form and a slot 11 which opens through the relatively wide end of the body. This forms the aforementioned key-hole slot. On the inner side, that is the side of the part facing the fabric 9 there is a counterbore or recess of circular form indicated at 12 of larger diameter than the hole 10 which functions as a sort of a keeper pocket. The rounded surfaces 13 of the lobes function as cams to feed the T-shaped fastener on the movable part, that is the male part, 14 into place.

Figure 5:
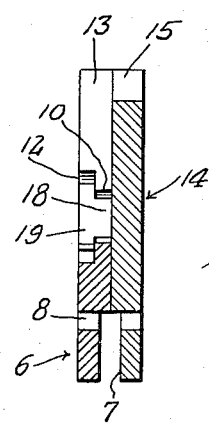
Figure 5 is a longitudinal or central sectional view with the parts joined together.

The part 14 is exactly the same in shape and proportion as the part 6 and has corresponding features 7 and 8. The lobe portions 15 in this instance do not have the function of cams but serve as elements to be matched with the lobes on the part 6 to avoid guess-work and to facilitate putting the two parts together in proper matched relationship. In other words when the parts come together in connected relationship as shown in Figure 5 the lobe portions register with each other and the apex ends are also in registration or alinement with each other. In this arrangement the apertured portions 8 are stitched to the fabric 16 as indicated at 17. The T-shaped fastener is on the central portion of the section 14. It is disposed so that the stem 18 and head 19 are located obliquely or at an angle to the central longitudinal dimensions of said part 14. This is an ingenious adaptation because by simply turning or twisting the part 14 slightly in relation to the part 6 when they are brought together the T-head 19 comes into sliding contact with either of the cams 13 and can be readily slid down through the slot 11 into the hole 10. When the two parts are again placed into superimposed matched relationship the T-head rests in the keeper seat 12 and is then out of registration with the slot 11. Consequently the two parts are nicely and neatly fastened together.

By way of introduction to the succeeding claims I would like to point out that I have used the expression "heart design" and "pear shaped" figuratively, it being understood that the parts 6 and 14 might just as well be referred to as of general triangular outline. The important phase of this part of the development has to do with the proper stitching of the parts on the sections 9 and 16 of the apparel or garment. In other words due to these shapes it is possible for the user to put the sections 6 and 14 properly in coacting position. This is due to the fact that the parts can be properly matched in superimposed relationship. I also want to emphasize the special lobe formation especially wherein the surfaces 13 function as cams to facilitate feeding the obliquely disposed T-shaped fastener into the keyhole slot.

It is thought that persons skilled in the art to which the invention relates will be able to obtain a clear understanding of the invention after considering the description in connection with the drawing. Therefore, a more lengthy description is regarded as unnecessary.

Minor changes in shape, size, and rearrangement of details coming within the field of invention claimed may be resorted to in actual practice, if desired.

I claim:

A separable fastener comprising a female plate, a male plate having a T-head, said female plate and male plate being provided with openings through which securing means can be disposed for securing the same to a body, said female plate being provided with a slot extending inwardly from one end, an opening in the female plate with which the slot merges, said female plate being provided with a recess on its body attaching side, said recess being circular and substantially larger than the opening in the same plate and being concentric therewith for receiving the T-head of the male plate when the T-head is engaged with the female plate.

SAMUEL SAMUEL.